US011054701B1

(12) United States Patent
Heber et al.

(10) Patent No.: US 11,054,701 B1
(45) Date of Patent: Jul. 6, 2021

(54) ILLUMINATION DEVICE FOR A SCREEN FOR A FREE AND A RESTRICTED VIEWING MODE (71) Applicant: siOPTICA GmbH, Jena (DE)

(72) Inventors: André Heber, Weimar (DE); Markus Klippstein, Jena (DE); Ambrose Peter Nari, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 17/177,835

(22) Filed: Feb. 17, 2021

(30) Foreign Application Priority Data

Feb. 18, 2020 (DE) ...................... 10 2020 001 232.9

(51) Int. Cl.
*G02F 1/1335* (2006.01)
*F21V 8/00* (2006.01)

(52) U.S. Cl.
CPC ..... *G02F 1/133607* (2021.01); *G02B 6/0051* (2013.01); *G02F 1/133536* (2013.01)

(58) Field of Classification Search
CPC ......... G02F 1/133607; G02F 1/133536; G02B 6/0051
See application file for complete search history.

(56) References Cited

U.S. PATENT DOCUMENTS

| 5,956,107 | A | 9/1999 | Hashimoto et al. | |
| 10,663,776 | B1* | 5/2020 | Hopkin | G09G 3/3426 |
| 2007/0008456 | A1 | 1/2007 | Lesage et al. | |
| 2007/0030240 | A1 | 2/2007 | Sumiyoshi et al. | |
| 2009/0067156 | A1 | 3/2009 | Bonnett et al. | |
| 2010/0103485 | A1* | 4/2010 | Haussler | G03H 1/02 359/9 |
| 2012/0235891 | A1 | 9/2012 | Nishitani et al. | |
| 2017/0069236 | A1* | 3/2017 | Klippstein | G09G 3/003 |
| 2017/0371092 | A1* | 12/2017 | Keranen | G02B 6/006 |
| 2018/0088270 | A1 | 3/2018 | Tuohioja et al. | |
| 2018/0267344 | A1 | 9/2018 | Wu | |

(Continued)

FOREIGN PATENT DOCUMENTS

CN 1987606 A 6/2007
CN 106195766 A 12/2016
(Continued)

*Primary Examiner* — Donald L Raleigh
(74) *Attorney, Agent, or Firm* — Christensen, Fonder, Dardi & Herbert PLLC (57) ABSTRACT

An illuminating apparatus for a display screen with a transmissive image generator, having a free-viewing mode and a restricted-viewing mode, comprising a background illuminator radiating light in a wide angular range, a plate-shaped light guide in front of the background illuminator with outcoupling elements, and light sources. Outcoupling element dimensions are smaller than the width and height of subpixels of the image generator, parts of the surface of two outcoupling elements are below each subpixel and the filling factor of the outcoupling elements is maximally 50% of the large surface of the light guide, and at least 80% of the light coupled out is radiated within an angular range of 60°, and more than 50% of the light is radiated away from or toward the background illuminator, and in the restricted mode, the background illuminator and light sources are off, and in the free-viewing mode, the background illuminator is on.

26 Claims, 4 Drawing Sheets

(56) References Cited

U.S. PATENT DOCUMENTS

2019/0353838 A1    11/2019   Heber et al.
2020/0292746 A1*   9/2020   Heber .................. G02B 6/0036

FOREIGN PATENT DOCUMENTS

| CN | 107734118 A | | 2/2018 | |
|---|---|---|---|---|
| DE | 11 2010 004 660 T5 | | 10/2012 | |
| DE | 10 2017 006 285 A1 | | 1/2019 | |
| GB | 2457693 A | * | 8/2009 | ........... H04N 13/351 |
| WO | WO 2015/121398 A1 | | 8/2015 | |

* cited by examiner

ILLUMINATION DEVICE FOR A SCREEN FOR A FREE AND A RESTRICTED VIEWING MODE

PRIORITY CLAIM

The present application claims priority to German Patent Application No. 10 2020 001 232.9, filed on Feb. 18, 2020, which said application is incorporated by reference in its entirety herein.

FIELD OF THE INVENTION

The invention is generally directed to illuminating apparatuses for display screens. More specifically the invention is directed to illuminating apparatuses for display apparatuses wherein the illuminating apparatus can be operated in at least two modes of operation, viz B1 for a free viewing mode and B2 for a restricted viewing mode.

BACKGROUND OF THE INVENTION

In recent years, great strides have been made in enlarging the visual angle of LCDs. Frequently, however, there are situations in which such a very large viewing range of a display screen can be a disadvantage. Increasingly, information such as banking data or other private particulars and sensitive data is becoming available on mobile devices such as notebooks and tablet PCs. Accordingly, users require some control of who is allowed to see such sensitive data; they must be able to choose between a wide viewing angle in order to share displayed information with others, e.g., when looking at vacation snaps or reading advertisements, and, on the other hand, a narrow viewing angle needed to keep displayed information private.

A similar problem is encountered in vehicle manufacturing: Here, when the motor is running, the driver must not be distracted by image contents such as digital entertainment shows, whereas a front-seat passenger would like to watch them during the ride. What is required, therefore, is a display screen that can be switched between corresponding display modes.

Accessory foils based on micro-louvers have already been used for mobile displays to provide them with optical data protection. However, such foils had no facility for changeover switching between viewing modes but had to be applied and removed manually. In addition, they have to be carried separately from the display screen when not in use. A substantial disadvantage is the light loss accompanying the use of such louver foils.

US 2009/0067156 discloses a great number of ideas to configure an illuminating system and a display device. In particular, the version illustrated there in FIGS. 3A and 3B uses two background illuminators (also known as backlights) consisting of wedge-shaped light guides, and an LCD panel, where the posterior background illuminator 40 is intended to positively create a wide illuminating angle, and the anterior background illuminator 38 is intended to positively create a narrow illuminating angle. It remains unclear, however, in what manner the background illuminator 38 is meant to create a narrow illuminating angle without converting the light having a wide illuminating angle, originating from background illuminator 40, essentially into light having a narrow illuminating angle when it passes background illuminator 38.

Regarding the embodiment shown in FIG. 5 of US 2009/0067156, it should be noted that the two light guides 46 and 48 each produce "narrow light", i.e. light with a narrow illuminating angle. Conversion of the light in light guide 48 into "wide light", i.e. light with a wide illuminating angle, is only achieved by means of a partial mirror 50, which has to be provided with prism structures in a complex process. This conversion extremely diminishes the light intensity, because the light that at first is radiated in a narrow illuminating angle (the only light available) is then spread out into a wide illuminating angle, as a rule into the semispace. As a result, the brightness (in terms of luminance) will be reduced by a factor of 5 or higher, depending on the parameters. Thus, this configuration is of little practical relevance.

In the embodiment according to FIG. 7 of US 2009/0067156, a phosphorus layer that converts UV light into visible light is an absolute must. This is rather complex; and given the aim to get sufficient light from the background illuminator to illuminate an LCD panel so that it can be read, one needs very high UV intensities. Therefore, this embodiment is expensive and complicated; shielding off the UV radiation alone makes it impracticable.

U.S. Pat. No. 5,956,107 A discloses a switchable light source, with which a display screen can be operated in several modes. The disadvantage here is that the outcoupling of light is completely effected by scattering, which yields but low efficiency and suboptimal light-directional effects. In particular, the way of attaining a focused light cone is not disclosed in any detail.

CN 107734118 A describes a display screen that allows its viewing angle to be controlled by means of two background illuminators. For this purpose, the upper of the two background illuminators is intended to radiate focused light. A special configuration of this is described featuring a grating with opaque and transparent segments. As a likely consequence, however, the light of the second background illuminator, which has to penetrate the first one in the direction of an LCD panel, is also focused, so that the public viewing mode intended for a wide viewing angle suffers a distinct angular curtailment.

US 2007/030240 A1 describes an optical element for controlling the direction of propagation of the light originating from a background illuminator. Requiring, e.g., liquid crystals in the form of PDLCs, this optical element is expensive on the one hand, and critically with regard to safety on the other hand, especially for end user applications, since, as a rule, PDLC liquid crystals require voltages above 60 V for switching.

CN 1987606 A, again, describes a display screen that allows its viewing angle to be controlled by means of two background illuminators. In particular, it features a first "light plate" that must be wedge-shaped to make possible the intended focused outcoupling of light. Finer details of the attainment of focused light outcoupling and corresponding angular conditions are not disclosed.

Furthermore, CN 106195766 A discloses two light sources for switching between two illumination modes, featuring sawtooth-shaped outcoupling structures for the outcoupling of focused light. The disadvantage here is that the sawtooth-shaped outcoupling structures contain disturbing vertical flanks that hamper or even prevent light focusing of a power needed for the privacy mode.

Furthermore, US 2018/0267344 A1 describes an assembly including two flat illuminating modules. Here, the light from the posterior illuminating module (as seen in viewing direction) is focused by a separate structure. After focusing, the light must pass the anterior illuminating module, which is provided with scattering elements. Thus, light focusing powerful enough for privacy cannot be optimally implemented.

DE 11 2010 004 660 T5 describes an LCD arrangement with a switchable background illuminator. Here, the light from the rear background illuminator is converted by the front background illuminator.

Finally, US 2007/0008456 A1 discloses the splitting up of a light radiation angle into at least three ranges, with two of them receiving light, as a rule. As a result, a privacy-protected display illuminated in that way may not be viewable from one direction only.

As a rule, the methods and arrangements described above share the disadvantage that they markedly reduce the brightness of the basic display screen and/or need an active, or at least special, optical element for switching between modes, and/or are complicated and expensive to fabricate and/or reduce the resolution in the free viewing mode.

The Applicant's WO 2015/121398 A1 described a display screen of the kind described at the start. For switching between modes, this screen essentially features scattering particles provided in the volume of the respective light guide. As a rule, however, the scattering particles selected there, consisting of a polymerizate, have the common disadvantage that light is coupled out of both large surfaces, whereby about half of the useful light is radiated into the wrong direction, i.e. toward the background illuminator, where, due to the arrangement, it cannot be recycled to a sufficient extent. Moreover, the scattering particles of polymerizate distributed in the volume of the light guide, especially in higher concentrations, may possibly lead to scattering effects that may lessen the privacy effect in the protected mode.

SUMMARY OF THE INVENTION

Departing therefrom, a problem of the invention is to describe an illuminating apparatus screen by which, in cooperation with a display screen, a secure presentation of information can be implemented by way of an optionally restricted viewing angle, with a second operating mode enabling free vision with a viewing angle that is as unrestricted as possible. The invention is intended to be implementable by simple means and as low-priced as possible. In both operating modes, the highest possible resolution should be visible, with particular preference of the native resolution of the screen used. Further, the invented solution should cause the least possible light loss.

According to the invention, this problem is solved by an illuminating apparatus for a display screen with a transmissive image generator, the image generator featuring pixels that are made up of subpixels, and wherein the illuminating apparatus can be operated in at least two modes, viz B1 for a free viewing mode, and B2 for a restricted viewing mode, comprising a background illuminator of planar extension that radiates light over a wide angular range ("wide" meaning more than 90° or even more than 120°, which may be defined relative to one or two preferred directions perpendicular to the surface normal of the background illuminator), a plate-shaped light guide that is located in front of the background illuminator (as seen in the viewing direction) and, on at least one of the large surfaces and/or within its volume, is provided with a plurality of outcoupling elements and, optionally, focusing elements, with the light guide being transparent to at least 70% of the light emitted by the background illuminator, light sources arranged laterally on at least one edge of the light guide, wherein the outcoupling elements couple out the light that originates from the light sources and is thrown back and forth between the large surfaces due to total reflection, the said outcoupling being effected by functional surfaces provided at material junctions of the outcoupling elements (this may be, e.g., the changeover of refractive indices between the light guide material and air, or, alternatively, a mirror coating or a grating applied), the said functional surfaces having such a structure, e.g., such a tilt, that light incident on them will be coupled out through one of the large surfaces at a defined angular range, wherein the focusing elements, if provided, restrict, at least partially in its propagation directions, at least 50% of the light coupled out by the outcoupling elements, wherein the form, number per unit area and extension of the outcoupling elements are chosen in such a way that each outcoupling element is smaller in its horizontal and vertical dimensions than the lesser of the width and the height of the subpixels of the image generator, (preferably even smaller than half of the said lesser of the width and the height of the subpixels of the image generator; in this way, the image becomes more homogeneous, and phenomena of superimposition of structural patterns and subpixel patterns can possibly be avoided), and that, in projection directions parallel to the surface normal of the light guide, parts or all of the surface of at least two outcoupling elements are arranged below each subpixel of the image generator, (preferably even more than two, e.g., three, four or yet more outcoupling elements are arranged, each either completely or in part, below each subpixel of the image generator in a projection direction parallel to the surface normal of the light guide), and that, in projection directions parallel to the surface normal of the light guide, the filling factor of the outcoupling elements is maximally 50% of the large surface of the light guide (this will ensure that sufficient unfocussed light from the background illuminator can penetrate the light guide unaffected), wherein, furthermore, a distribution of the outcoupling elements and, if provided, the focusing elements as well as their respective forms, on at least one of the large surfaces and/or within the volume of the light guide, is specified in such a way that light radiated by the light sources into the light guide and coupled out of the light guide by the outcoupling elements satisfies the following conditions:

At least 80% of the total quantity of light coupled out of one of the large surfaces is radiated within a relative angular range of altogether maximally 60°, preferably 40°, related to one or two specified, mutually perpendicular preferred directions (e.g., in the horizontal angular range between −20° and +20° for a centrally focused light direction, or between −30° and +10° for a light direction tilted sideways), and more than 50% of the quantity of light coupled out of the light guide is radiated either in the direction away from the background illuminator or in the direction towards the background illuminator, wherein, in operating mode B2, the background illuminator as well as the light sources are switched on and wherein, in operating mode B 1, at least the background illuminator is switched on.

In the illuminating apparatus, the light guide consists, e.g., of a transparent plastic or of glass. For example, the light guide or its substrate may contain at least 40 weight % polymethylmethacrylate, preferably at least 60 weight % polymethylmethacrylate, related to its weight. Alternatively, the material may be polycarbonate (PC), COP or PMMI. Other embodiments are possible as well.

The desired properties essential to the invention, i.e., the properties of the outcoupling elements regarding their number per unit area, their form and extension in three dimensions as well as their distribution over at least one of the large surfaces and/or within the volume of the light guide can be determined, for example, by way of some optical simulation software such as "LightTools" by Synopsis or other suppliers, and then implemented physically.

Examples of possibly helpful three-dimensional forms of the outcoupling elements 6 are described in US 2018/0088270 A1, especially in the drawings FIG. 3A, 4B, 5A, 9 or 10 in connection with the appurtenant textual descriptions.

In prior art, the radiation characteristics of the light guide described above are not achieved without supplementary layers such as, e.g., reflectors, BEFs, DBEFs, prism foils and/or lamellar filters. Here, the special radiation characteristics are used especially for achieving an adequate efficiency of the light yield and for focusing the light in the restricted mode B2 because, in this mode, a display screen equipped with the invented illuminating apparatus is typically required to be visible from a narrow angular range only.

The preferred directions may be equivalent to the abovementioned vertical or horizontal directions in an outer reference frame.

Many applications specify exactly one preferred direction perpendicular to the surface normal; this direction corresponds to the horizontal direction with reference to the orientation of the image generator.

The outcoupling elements and/or the focusing elements preferably have maximum dimensions of 100 µm, more preferably between 8 µm and 30 µm.

If focusing elements are provided on one of the large surfaces of the light guide, preferably at least a portion of the outcoupling elements are arranged on the opposite large surface. In this case, the focus of the focusing elements is optionally located in, or close to, the plane of the said opposite large surface. Light orientation by the focusing elements becomes particularly efficient if the focus of each focusing element is located in a corresponding outcoupling element.

Furthermore, the focusing elements are preferably implemented, possibly by adapting their size, form and/or focus position, in such a way that light originating from the planar background illuminator and penetrating the light guide hardly suffers any loss of its intensity (i.e., maximally 20% in toto over the semispace).

Ideally, the light guide is implemented in such a way that more than half of the light radiated by the light sources into the light guide and coupled out of the light guide by the outcoupling elements and influenced by the focusing elements (if provided) in respect of its propagation directions with reference to the said one or two specified, mutually perpendicular preferred directions, has a mean radiation angle varied across the surface. The mean outcoupling angle thus varies across the surface of the light guide. In interaction with an image generator, then, the image perceived by a viewer is focused at this viewer. This would not be the case, if light were bundled by parallel micro-louvers as common in prior art.

Furthermore, the outcoupling elements and/or focusing elements consist of microlenses and/or microprisms and/or diffractive structures (gratings) and/or three-dimensional structural elements, especially if they are fashioned on a large surface of the light guide. As outcoupling elements, in particular, also scattering elements are eligible, for example. As focusing elements, microlouvers that restrict the light direction are eligible as well. Moreover, combinations of the aforementioned versions can be used as outcoupling elements and/or focusing elements. Other possible configurations are, e.g., prism-like three-dimensional structures.

In the manufacturing of the of the light guide, the outcoupling elements as well as the focusing elements (if provided) can, in principle, be distributed in or on the light guide in various ways to meet adaptable and specifiable conditions for light outcoupling. The outcoupling elements are locally limited structural variations in the volume or/and on the surfaces of the light guide. Therefore, the concept of the outcoupling element as well as that of the focusing element explicitly do not cover any additional optical layers applied on the surfaces of the light guide, such as, for example, diffusion coatings, reflection coatings, or brightness enhancement or polarization-recycling (dual brightness enhancement) films ((D)BEF). These additional layers not covered by the concept of "outcoupling element" normally rest but loosely on the large surfaces without forming a physical entity with the light guide. By contrast, varnishes applied to the large surfaces and bonding to the light guide by chemical reactions do form a physical entity with the light guide and cannot be separated from it; such varnishes; therefore, do not count among additional layers in the above sense.

The structure of the outcoupling elements can be specified, so that the effect of each outcoupling element is at least approximately known, and that properties of the light guide or of the light exiting light guide can be laid down by a given distribution of the outcoupling elements and their respective forms.

Moreover, it is feasible that the outcoupling elements and/or focusing elements, in case they consist of microlenses and/or microprisms and/or three-dimensional structural elements, are at least partially covered by a reflecting layer. This layer may feature full or partial, especially angle-dependent, reflection.

Alternatively, if the outcoupling elements within the volume of the light guide are configured as cavities, the preferably have the outer shapes of microlenses, microprisms, diffractive structures, nanoparticles and/or three-dimensional structural elements. Here again, combinations and/or other configurations are possible, such as, e.g., prism-like three-dimensional structures.

The cavities are filled with a gaseous, liquid or solid material, with the material having a refractive index different from, preferably lower than, that of the material used for the light guide, or the cavities are evacuated.

Further, the cavities can be filled with a gaseous, liquid or solid material, with the material having a haze value different from, preferably higher than, that of the material used for the light guide.

Finally, the light guide can be formed by two substrate layers preferably of the same type, combined with one another via interfaces. Here, the cavities are formed as pockets on at least one of the interfaces; preferably, they have the outer shape of microlenses, microprisms, three-dimensional structural elements or diffractive structures.

In case of diffractive structures, these may be, e.g., a hologram or a grating/diffraction grating.

If the outcoupling elements and/or the focusing elements are provided on at least one of the large surfaces of the light guide, they are advantageously formed from a polymer (e.g., varnish, plastic such as PC or PMMA, etc.) or glass structured by means of an embossing tool. This is possible in mass production, e.g., by applying a UV-curing material (e.g., a lacquer or varnish, a monomer, etc.) onto a light guide substrate, structuring the said material by means of a tool and curing it by UV radiation, e.g., polymerization. Other materials curably by radiation can also be used. Fashioning the pockets to implement the outcoupling elements can be done, e.g., mechanically, by lithography or printing, or also by the deposition, conversion, removal or dissolution of material.

In this way, it is possible to implement, e.g., grating structures, microprisms—either convex, with a plastic portion on the surface showing outward, and/or concave, as an impression or recess within the surface layer of the structured plastic—other three-dimensional structural elements of other shapes, or also microlenses at low cost and suitable for mass production. Concave and convex structures can be equally used.

Also eligible as outcoupling elements within the volume are, e.g., nanoparticles such as titanium dioxide.

It is possible that outcoupling elements and/or focusing elements are provided on both large surfaces and optionally also within the volume.

Moreover, it can be of advantage to arrange an absorbing layer on the edge of the light guide opposite the light incoupling side of the light sources, so that light incident there is not thrown back again and possibly outcoupled at undesirable angles.

Preferably, the invention is implemented in a display screen that can be operated in at least two operating modes, viz B1 for a free viewing mode, and B2 for a restricted viewing mode, and which comprises at least the following components:
an illuminating apparatus according to the invention, and
a transmissive image generator arranged in front of the light guide (as seen in the viewing direction).

The image generator taken in account in the following discussion is an LCD panel. Here it can be of advantage to arrange at least one polarizing filter above or below the light guide (as a rule, this filter polarizes light linearly, and its polarizing direction is parallel to the input-side polarizing direction of the LCD panel. If such a polarizing filter is provided behind the light guide (in the viewing direction), light that is reflected by the LCD panel and not polarized in parallel to the input-side polarizing direction of the LCD panel will be absorbed and thus neither scattered inside, nor reflected by, the light guide, which is beneficial for the quality of the viewing mode B2. By contrast, if the said polarizing filter is arranged in front of the light guide (in the viewing direction), light that is reflected there by the LCD panel and not polarized in parallel to the input-side polarizing direction of the LCD panel will be absorbed. This means that, advantageously, no or almost no light is reflected by the LCD panel back onto the light guide, because in the light guide this light could be returned to the panel as stray light, which can deteriorate the viewing mode B2.

The said LCD panel as an image generator preferably has a maximum haze value of 10% and/or a maximum pre-defined scattering property. The latter might be, e.g., that at least 90% of the light passing the LCD panel is scattered by maximally 10°.

Advantageously, the invented illuminating apparatus can, in interaction with an LCD panel be configured as an image generator for the recycling of light polarized in a manner unfit for the input side of the LCD panel, the illuminating apparatus then further comprising
an optical element located in front of the plate-shaped light guide (as seen in the viewing direction), that transmits light of a first type of polarization (this type of polarization corresponding to the input-side polarization of the said LCD panel) and reflects light of a second type of polarization,
an optical element located behind the plate-shaped light guide, which, in a first alternative, is configured as a switchable mirror and optionally reflects light coming from the direction of the light guide, or which, in a second alternative, permanently and simultaneously reflects and transmits light, or which, in a third alternative, reflects and/or transmits light depending on its polarization.

In this useful configuration, the light of the second type of polarization, which otherwise would be absorbed by the input-side polarizing filter of the LCD and thus would not be available for the performance of the apparatus, is returned to the optical element through the light guide. The said optical element, in turn, returns at least part of the light originating from, and incident upon, the optical element back toward the LCD panel. Due to the reflection by, and/or passage through, the light guide equipped with outcoupling elements and/or focusing elements, at least part of that light will be polarized in a different manner, so that it passes the input-side polarizer of the LCD panel, thus enhancing the efficiency of the configuration. Ideally, in this configuration, the light guide does not, or almost not, feature birefringence, so that the polarization recycling operates without visible color patterns.

Further versions of this configuration are provided with at least one retardation element and/or a partially reflecting mirror.

Apart from that, outcoupling elements may vary by different shapes and/or sizes.

Further, it is of advantage in some applications if the said restricted angular range for the B2 mode is arranged asymmetrically around the surface normal of the background illuminator. The asymmetry is preferably arranged in one of the preferred directions. This is helpful especially for use in vehicles, e.g. if a display screen combined with the invented illuminating apparatus is arranged on the dashboard approximately in the middle between driver and front-seat passenger (known as a center information display). Here, the restricted angular range in B3 mode, exclusively intended for vision by the front-seat passenger, has to be configured asymmetrically, i.e., directed toward the passenger. Here, the preferred direction, in which the asymmetry is fashioned, corresponds to the horizontal.

The background illuminator consists, for example, of a background illuminator unit typical for an LCD with a light guide that receives light from light sources, a diffusor, at least one prism foil, and perhaps a polarizing reflector (3M DBEF™ or wire grid polarizer), the polarized transmission of which matches the polarized transmission of the input-side of the LCD panel, and a reflector in the rear. Other embodiments are possible as well. Accordingly, the background illuminator may basically be designed like an LED-background illuminator, for example like a side-light, edgelight, direct LED backlight, edge LED backlight, OLED or some other surface emitter.

Means for diminishing or control of reflections, e.g., an antiglare and/or antireflection coating, may be arranged on the upper side of the image generator and/or on at least one of the large surfaces of the light guide.

The invented illuminating apparatus with a display screen is applicable to particular advantage inside a vehicle for the optional presentation of imagery content either for a front-seat passenger only (in mode B2) or simultaneously for the driver and the front-seat passenger (in mode B1). The former is helpful, e.g., of the passenger is watching entertainment contents, which might distract the driver.

A display screen according to the invention can also be used for entering or reading confidential data, such as PIN numbers, e-mails, text messages or passwords on cash dispensers, payment terminals or mobile devices.

In all embodiments mentioned before, the said light sources may be LEDs, LED lines or laser diodes. Other versions are also feasible and are within the scope of the invention.

Another embodiment of the invented display screen consists in that, in front of the image generator (in the viewing direction), another light guide (e.g., made of glass, polymer or some plastic), provided with means for the outcoupling of light, is arranged that can laterally be fed with light by light sources. The outcoupling means used here are, for example, those described above, or those known in prior art, e.g., nanoparticles such as titanium dioxide, barium sulphate etc. in suitable sizes and quantities—as described, e.g., in WO 2015/121398 A1 and WO 2017/089482 A1—homogeneously distributed in the volume of the light guide. By means of this embodiment, any residual light left unintentionally in mode B2 can be superimposed on, or irradiated into, the angular ranges actually to be protected against eye contact, to such an extent that no contrast is perceived and, thus, no image is visible from the angles not released. Here, too, the outcoupling elements may be configured in the form of cavities or fashioned on interfaces, which in case of application inside a vehicle, e.g., ensure that information is displayed only to the front-seat passenger but not to the driver, the radiation being restricted to the respective part of the space.

The appropriate light sources are designed to radiate colored or white light. They can radiate light of a color that does not appear in the image presented by the transmissive image generator.

Alternatively, it is possible for the light sources to radiate light of a color that does appear in the image presented by the transmissive image or is close to such a color in the color spectrum. Finally, it is feasible for the light sources to radiate light of a color approximately corresponding to the color complementary to a color appearing in the image presented by the transmissive image generator.

The term "colored light" particularly refers to visible light that is not white, i.e., for example, light of the colors red, green, blue, turquoise, cyan, magenta or yellow. Further, this light may optionally be radiated in varied degrees of brightness. Moreover, itis possible that the chromaticity of the light emitted by the light sources is modulated with time, e.g., with regard to hue and/or brightness. In addition, the light sources may comprise a variety of light sources e.g., RGB-LEDs in LED rows that, either simultaneously or at intervals of time and/or space, radiate light of differing hue and/or different brightness.

Furthermore, the desired restricted angular ranges for the restricted vision mode B2 may be defined and implemented independently from each other for the horizontal and the vertical direction. For example, it may be useful for the vertical direction to have a larger angle than for the horizontal one (or perhaps no restriction at all), e.g., if persons of different heights are intended to see a display on a cash dispenser, whereas vision from the side is to remain highly or completely restricted. By contrast, due to safety regulations, POS payment terminals frequently require restricted vision in mode B2 in both the horizontal and the vertical direction.

On principle, the performance of this invention remains unaffected even if the parameters described above are varied within certain limits.

It is understood that the features mentioned before and those to be explained below are applicable not only in the combinations stated but also in other combinations or as stand-alone features without leaving the scope of the present invention.

BRIEF DESCRIPTION OF THE DRAWINGS

Below, the invention will be explained in more detail with reference to the accompanying drawings, which also show features essential to the invention, among others, and in which.

The drawings are not to scale and illustrate principles only.

DETAILED DESCRIPTION

Figure 1:
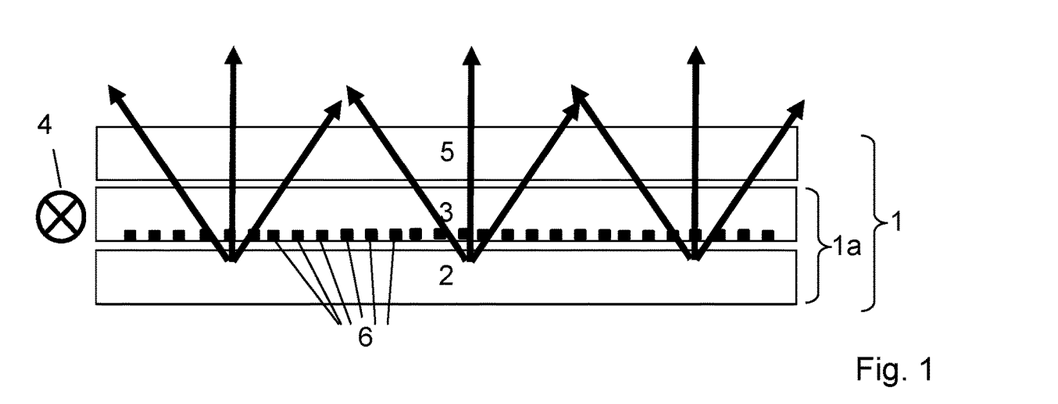
FIG. 1 is a diagram illustrating the principle of the invented illuminating apparatus in interaction with an image generator in operating mode B1 for a free viewing mode.

FIG. 1 is a diagram illustrating the principle of the invented illuminating apparatus 1*a* for a display screen 1 with a transmissive image generator 5, with the image generator 5 featuring pixels that are made up of subpixels, and with the illuminating apparatus 1*a* being operable in at least two operating modes, viz B1 for a free viewing mode and B2 for a restricted viewing mode. The invented illuminating apparatus 1*a* comprises:

a background illuminator 2 of planar extension that radiates light over a wide angular range ("wide" meaning more than 90° or even more than 120°, which may be defined relative to one or two preferred directions perpendicular to the surface normal of the background illuminator), a plate-shaped light guide 3 that is located in front of the background illuminator 2 (as seen in the viewing direction) and, on one of the large surfaces, is provided with a plurality of outcoupling elements 6 (only part of which are shown, drawn exaggerated in size), with the light guide 3 being transparent to at least 70% of the light emitted by the background illuminator 2, light sources 4 laterally arranged on at least one edge of the light guide 3, wherein outcoupling of the light originating from the light sources 4 and reflected back and forth between the large surfaces in the light guide 3 due to total reflection is effected due to the outcoupling elements 6 having functional surfaces at material junctions (possibly the changeover of refractive indices between the light guide material and air, or else a mirror coating or a grating applied), the functional surfaces having a structure, e.g., a tilt, that causes light incident on them to be coupled out through one of the large surfaces at a defined angular range, wherein further the form, number per area unit and extension of the outcoupling elements 6 are chosen in such a way that each outcoupling element 6 is smaller in its horizontal and vertical dimensions than the lesser of the width and the height of the subpixels of the image generator 5, (preferably even smaller than half the said lesser of the width and the height of the subpixels of the image generator; in this way, the image becomes more homogeneous, and phenomena of superimposition of structural patterns and subpixel patterns can possibly be avoided), and that, in projection directions parallel to the surface normal of the light guide 3, parts or all of the surface of at least two outcoupling elements 6 are arranged below each subpixel of the image generator 5, (preferably even more than two, e.g., three, four or yet more outcoupling elements are arranged, each either completely or in part, below each subpixel of the image generator in a projection direction parallel to the surface normal of the light guide), and that, in projection directions parallel to the surface normal of the light guide 3, the filling factor of the outcoupling elements 6 amounts to maximally 50% of the large surface of the light guide 3 (this will ensure that sufficient unfocussed light from the background illuminator can penetrate the light guide unaffected, which explicitly makes it possible that light originating from the background illuminator 2 can penetrate the outcoupling elements 6), wherein, furthermore, a distribution of the outcoupling elements 6 as well as their respective forms, on at least one of the large surfaces and/or within the volume of the light guide 3, is specified in such a way that light radiated by the light sources 4 into the light guide 3 and coupled out of the light guide 3 by the outcoupling elements 6 satisfies the following conditions:

At least 80% of the total quantity of light coupled out of one of the large surfaces is radiated within a relative angular range of altogether maximally 60°, preferably 40°, related to one or two specified, mutually perpendicular preferred directions (e.g., in the horizontal angular range between −20° and +20° for a centrally focused light direction, or between −30° and +10° for a light direction tilted sideways), and more than 50% of the quantity of light coupled out of the light guide 3 is radiated either in the direction away from the background illuminator 2 or in the direction towards the background illuminator 2, wherein, in operating mode B2, the background illuminator 2 as well as the light sources 4 are switched on and wherein, in operating mode B 1, at least the background illuminator 2 is switched on.

Figure 8:
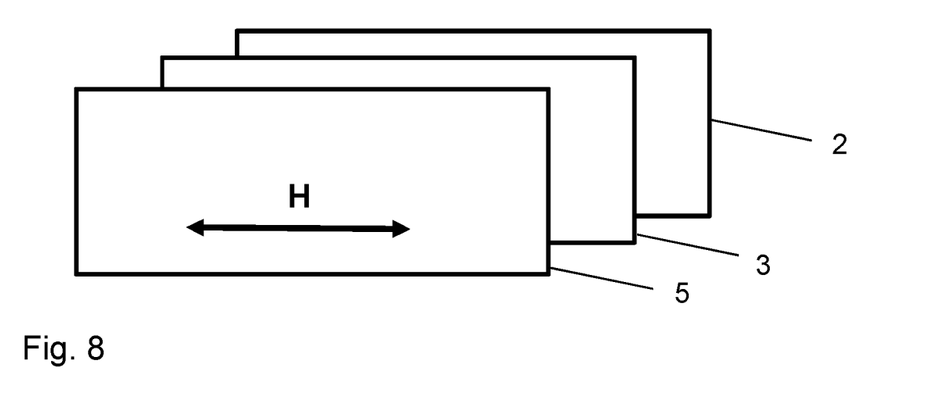
FIG. 8 is a schematic representation of the definition of the horizontal direction.

The preferred directions extend perpendicularly to each other within a plane on the light guide 3 or on the surface of the background illuminator 2. When in operation, e.g., in a payment terminal or in a car, the display screen 1 is then fixed relative to its outer environment, and the preferred directions—irrespective of a "portrait" or "landscape" orientation of the display screen 1—can be assigned, e.g., the terms "vertical" and "horizontal", which, strictly speaking, refer to the external coordinate system of the environment. "Vertical" corresponds to the top-to-bottom direction on the display screen 1, whereas "horizontal" corresponds to the left-to-right direction, as indicated in FIG. 8 by the "H" direction (for "horizontal").

In the illuminating apparatus 1*a*, the light guide 3 consists, e.g., of a transparent plastic or of glass. For example, the light guide or its substrate may contain at least 40 weight % polymethylmethacrylate, preferably at least 60 weight % polymethylmethacrylate, related to its weight. Alternatively, the material may be polycarbonate (PC), COP or PMMI. Other embodiments are possible as well.

The desired properties essential to the invention, i.e. the properties of the outcoupling elements 6 regarding their number per unit area, their form and extension in three dimensions as well as their distribution over at least one of the large surfaces and/or within the volume of the light guide 3 can be determined, for example, by use of an optical simulation software such as "LightTools" by Synopsis or other suppliers, and then implemented physically.

The structure of the outcoupling elements 6 can be specified, so that the effect of each outcoupling element 6 is at least approximately known, and properties of the light guide 3 or of the light exiting the light guide 3 can be laid down by a given distribution of the outcoupling elements and their respective forms.

Examples of feasibly helpful three-dimensional forms of the outcoupling elements 6 are described in US 2018/0088270 A1, especially in the drawings FIG. 3A, 4B, 5A, 9 or 10 in connection with the accompanying textual description, which is incorporated herein by reference.

Figures 4, 5A:
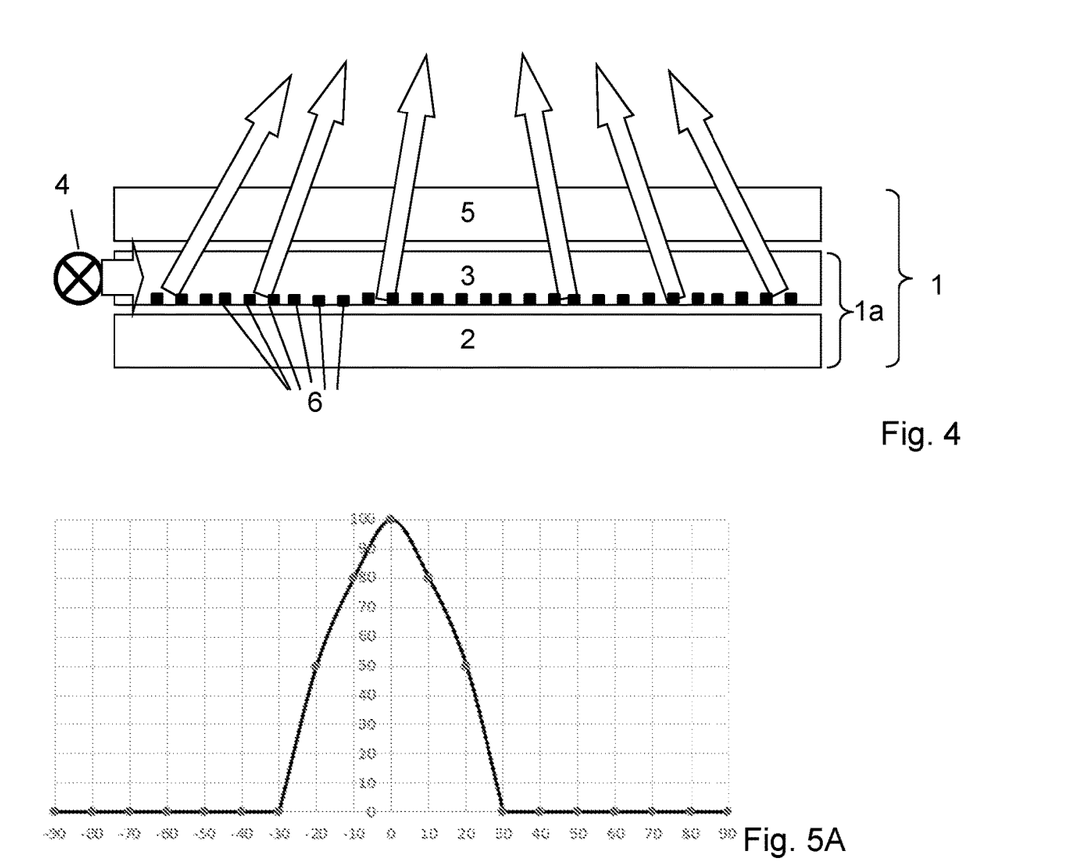
FIG. 4 is a diagram illustrating the principle of the invented illuminating apparatus in interaction with an image generator in mode B2 for a restricted viewing mode in another embodiment.
FIGS. 5A-5C are exemplary graphical diagrams of the light quantities coupled out of the light guide covering selected angular ranges.

In an exemplary embodiment, a plurality of such outcoupling elements 6 (e.g., several million pieces per square decimeter) can be distributed on the lower large surface of the light guide 3 as shown in the abovementioned FIG. 5A, either evenly or with varying density (especially with density increasing with the growing distance from the light sources 4), with the outcoupling elements 6 having an average tilt angle of about 50° in the prism. As a result, light is coupled out in a focused manner, as needed for the invention.

In the prior art, the above-described radiation characteristics of the light guide 3 are not achieved without supplementary layers such as, e.g., reflectors, BEFs, DBEFs, prism foils and/or louver filters. Here, the special radiation characteristics are used especially for achieving an adequate efficiency of the light yield and for focusing the light in the restricted mode, B2 because, in this mode, a display screen 1 equipped with the invented illuminating apparatus 1a is typically required to be visible from a narrow angular range only.

The preferred directions may be equivalent to the above-mentioned vertical or horizontal directions in an outer reference frame.

Many applications specify exactly one preferred direction perpendicular to the surface normal; this direction corresponds to the horizontal direction referring to the orientation of the image generator 5.

In the first, non-restricted mode of operation according to FIG. 1, it is just the background illuminator 2 that is switched on. This radiates light over quite a broad angular range as indicated schematically by the black arrows. This light penetrates the transmissive image generator 5, e.g., an LCD panel. Thus, the image presented on the image generator 5 is visible from a wide angular range.

Figure 2:
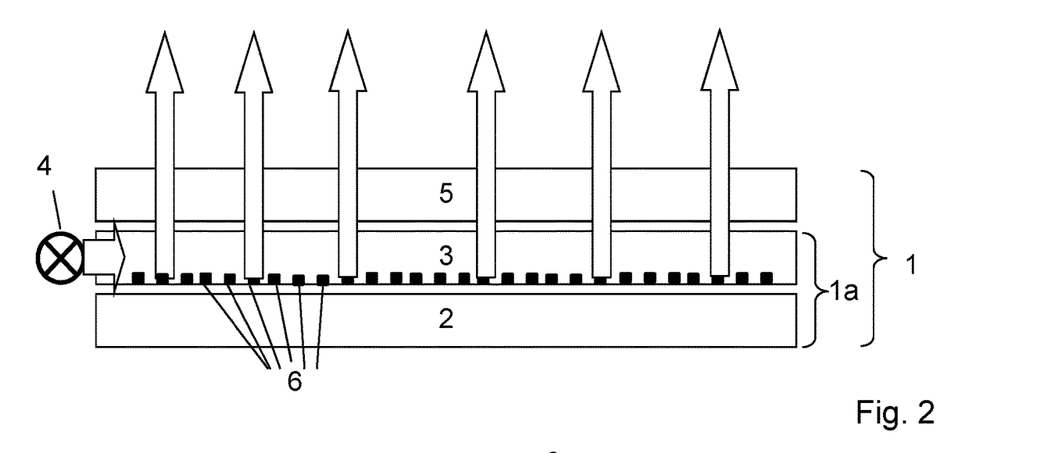
FIG. 2 is a diagram illustrating the principle of the invented illuminating apparatus in interaction with an image generator in operating mode B2 for a restricted viewing mode.

Compared with that, FIG. 2 is a diagram illustrating the principle of the invented illuminating apparatus in interaction with an image generator 5 in operating mode B2 for a restricted viewing mode. Here, the background illuminator 2 is switched off, whereas the light sources 4 are switched on, coupling light into the light guide 3.

The light coupled into the light guide 3 laterally by the light sources 4 is coupled out of the lower large surface of the light guide 3, on which the outcoupling elements 6 are located, and leaves the light guide 3 through the upper large surface of the light guide. According to the invention, the light is coupled out of the upper large surface of the light guide 3 in the horizontal direction and at a restricted angle. In the drawing, however, the outcoupling elements 6 are only roughly outlined, whereas in reality they have to be present in a great number, each being microscopic in size.

As said, light is laterally coupled from the light sources 4, e.g., LEDs, into the light guide 3. Due to total reflection, rays of the light coupled in is reflected by the outer wall back into the light guide 3 until it finally (possibly repeatedly) hits an outcoupling element 6 to be coupled out as desired. In the drawing, outcoupling in a restricted angular range is suggested by the rays, which are essentially parallel here. For clarity's sake, the presentation of FIG. 2 is highly stylized; in reality, the light guide 3 includes a very great number of ray paths.

Figure 3:
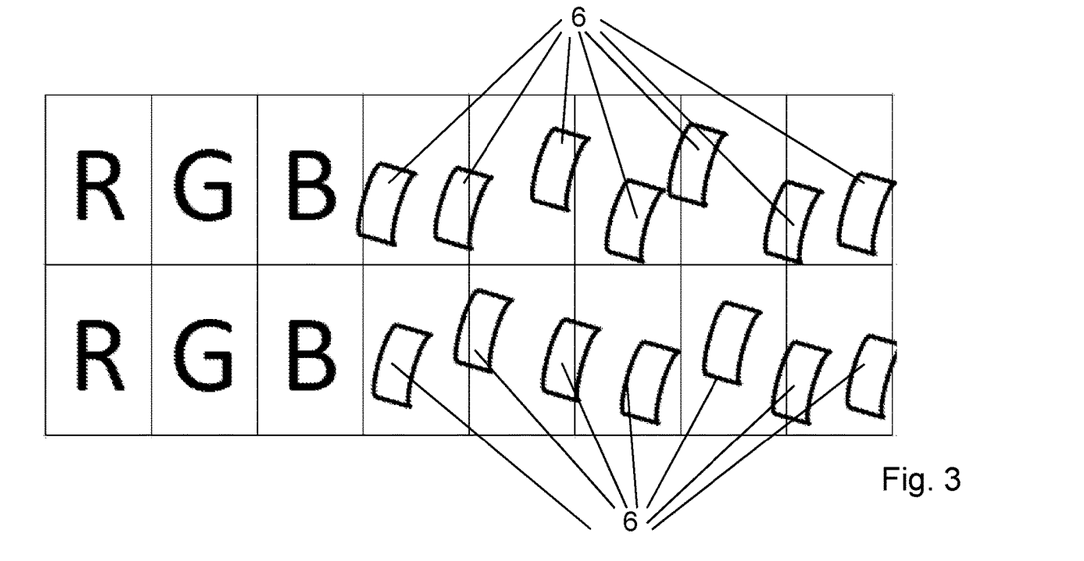
FIG. 3 is a schematic representation to explain the parallel projection of the subpixels of an image generator onto the outcoupling elements of the light guide.

FIG. 3 is a schematic representation intended for the better understanding of the parallel projection of the subpixels of an image generator 5 onto the outcoupling elements 6 of the light guide. The inscription RGB for red-green-blue indicates the subpixels in a highly simplified manner. On the right part of the drawing it can be seen that, in case of projection parallel to the surface normal of the light guide 3, the entire surface, or parts of it, of at least two (different) outcoupling elements 6 are arranged below each subpixel of the image generator 5.

Moreover, it can be seen in FIG. 3 that the form, number per unit area and extension of the outcoupling elements 6 are selected to ensure that, in case of the said parallel projection, the horizontal and vertical dimensions of each outcoupling element 6 are smaller than the lesser of the width and the height of the subpixels of the image generator 5.

Here, the outcoupling elements 6, which are drawn in a highly stylized manner in FIG. 3, correspond, for example, to prism-like three-dimensional structures.

Ideally, the light guide 3 is implemented in such a way that more than half of the light radiated by the light sources 4 into the light guide 3 and coupled out of the light guide 3 by the outcoupling elements 6 and influenced by the focusing elements 6a (if provided) in respect of its propagation directions with reference to the said one or two specified, mutually perpendicular preferred directions, has a mean radiation angle varied across the surface. The mean outcoupling angle thus varies across the surface of the light guide 3, as outlined in the example of FIG. 4. In interaction with an image generator 5, then, the image perceived by a viewer is focused at this viewer. This would not be the case, if light were bundled by parallel micro-louvers as common in prior art, or if the light would be coupled out as shown schematically in FIG. 1.

Figure 5B:
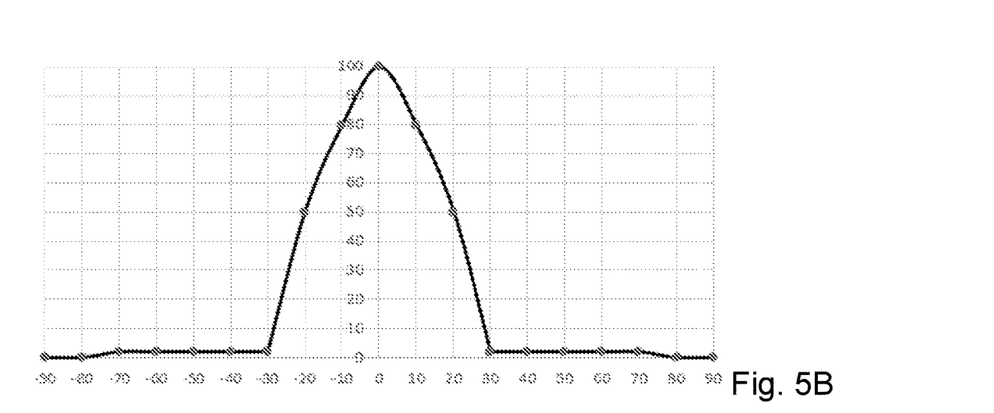
Figure 5C:
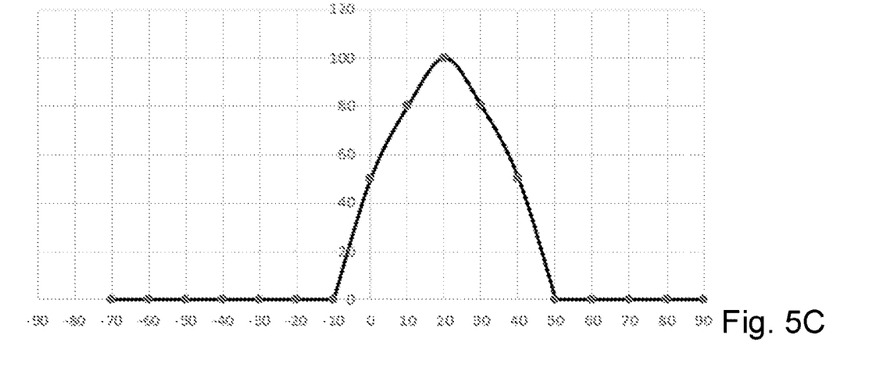

FIGS. 5A-5C are exemplary diagrams of the light quantities outcoupled from the light guide for selected angular ranges. Here, the abscissa corresponds to the horizontal or vertical light radiation angle, and the ordinate corresponds to the standardized light quantity radiated into the respective angle (as a percentage). In all three examples, it always applies that at least 80% of the total light quantity coupled out of one of the large surfaces is radiated within a relative angular range of maximally 60°, referred to one or two specified, mutually perpendicular preferred directions.

In the example of FIG. 5A, 100% of the light (which, in practice, will certainly be attained only with a tolerance of several percent) are radiated within an angular range of −30° to +30°, i.e. an angular range of 60° all together.

In the example of FIG. 5B, more than 90% of the light are radiated within an angular range of −30° to +30°, i.e. an angular range of 60° all together, which has a greater probability to be implemented in practice.

In the example of FIG. 5C, 100% of the light (which, in practice, will certainly be attained only with a tolerance of several percent) are radiated within an angular range of −10° to +50°, i.e. an angular range of 60° all together. This corresponds to a light direction tilted sideways.

If focusing elements 6a are provided on one of the large surfaces of the light guide 3, preferably at least part of the outcoupling elements 6 are arranged on the opposite large surface. In this case, the focus of the focusing elements 6a is optionally located in or near the plane of the said opposite large surface. Light alignment by the focusing elements 6a becomes particularly efficient if the focus of each focusing element 6a is located in a corresponding outcoupling element 6.

Further, the focusing elements 6a are preferably implemented, e.g., by their size, form and/or focus position, in such a way that the intensity of backlight originating from the background illuminator 2 of planar extension and passing the light guide 3 will hardly be weakened (i.e., by a total of maximally 20% across the half-space).

Figure 6:
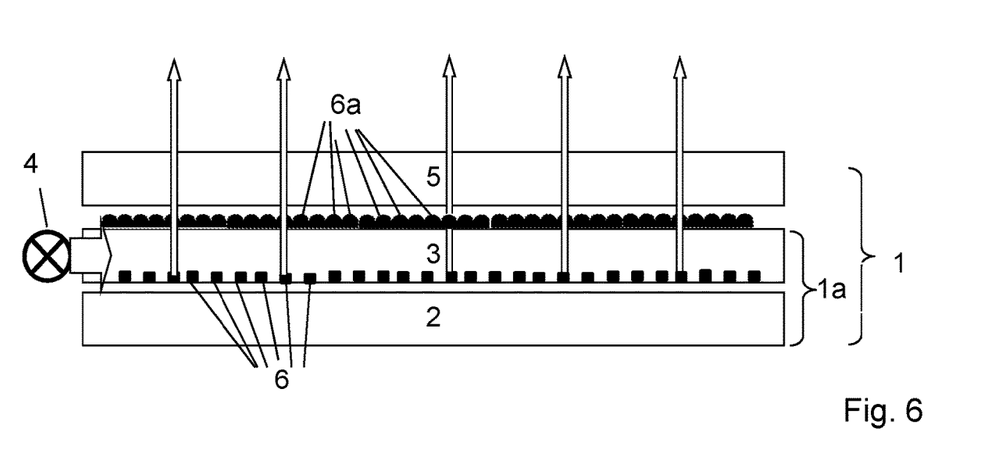
FIG. 6 is a diagram illustrating the principle of the invented illuminating apparatus in interaction with an image generator in mode B2 for a restricted viewing mode in yet another embodiment that contains focusing elements.

In that context, FIG. 6 is a diagram illustrating the principle of the invented illuminating apparatus 1a for a display screen 1 with a transmissive image generator 5, wherein the image generator 5 features pixels that are, in turn, assemblies of subpixels, and wherein the illuminating apparatus 1a can be operated in t least two modes of operation, viz B1 for a free viewing mode and B2 for a restricted viewing mode. The invented illuminating apparatus 1a comprises a background illuminator 2 of planar extension that radiates light over a wide angular range, a plate-shaped light guide 3 that is located in front of the background illuminator 2 (as seen in the viewing direction) and, on at least one of the large surfaces and/or within its volume, is provided with a plurality of outcoupling elements 6 (only part of which are shown, drawn exaggerated in size) and focusing elements 6a, with the light guide 3 being transparent to at least 70% of the light emitted by the background illuminator 2, light sources 4 arranged laterally on at least one edge of the light guide 3, wherein the outcoupling elements 6 couple out the light that originates from the light sources 4 and is thrown back and forth between the large surfaces due to total reflection, the said outcoupling being effected by functional surfaces provided at material junctions of the outcoupling elements (this may be, e.g., the changeover of refractive indices between the light guide material and air, or, alternatively, a mirror coating or a grating applied), the said functional surfaces having such a structure, e.g., such a tilt, that light incident on them will be coupled out through one of the large surfaces at a defined angular range, wherein the focusing elements 6a restrict, at least partially in its propagation directions, at least 50% of the light coupled out by the outcoupling elements 6, wherein the form, number per unit area and extension of the outcoupling elements 6 are chosen in such a way that each outcoupling element 6 is smaller in its horizontal and vertical dimensions than the lesser of the width and the height of the subpixels of the image generator 5, and that, in projection directions parallel to the surface normal of the light guide 3, parts or all of the surface of at least two outcoupling elements 6 are arranged below each subpixel of the image generator 5, and that, in projection directions parallel to the surface normal of the light guide 3, the filling factor of the outcoupling elements 6 is maximally 50% of the large surface of the light guide 3, wherein, furthermore, a distribution of the outcoupling elements 6 and the focusing elements 6a as well as their respective forms, on at least one of the large surfaces and/or within the volume of the light guide, is specified in such a way that light radiated by the light sources 4 into the light guide 3, coupled out of the light guide 3 by the outcoupling elements 6, and with its light propagation directions influenced by the focusing elements 6a, satisfies the following conditions:

At least 80% of the total quantity of light coupled out of one of the large surfaces is radiated within a relative angular range of altogether maximally 60°, preferably 40°, with reference to one or two specified, mutually perpendicular preferred directions, and more than 50% of the quantity of light coupled out of the light guide 3 is radiated either in the direction away from the background illuminator or in the direction towards the background illuminator, wherein, in operating mode B2, the background illuminator as well as the light sources are switched on and wherein, in operating mode B 1, at least the background illuminator is switched on.

In all embodiments, the outcoupling elements 6 and/or the focusing elements 6a have maximum dimensions of 100 μm, preferably between 8 μm and 30 μm.

Further, the outcoupling elements 6 and/or the focusing elements 6a consist of microlenses and/or microprisms and/or diffractive structures (gratings) and/or three-dimensional structural elements, especially if they are configured on a large surface of the light guide. The outcoupling elements 6, in particular, may also consist, e.g., of light scattering elements. For the focusing elements, direction-restricting microlouvers are eligible as well. Furthermore, both the outcoupling elements 6 and the focusing elements 6a may be combinations of the aforementioned versions. Other configurations are feasible as well, such as, e.g., prism-like three-dimensional structures.

In the manufacturing of the light guide, the outcoupling elements 6 as well as the focusing elements 6a (if provided) can, in principle, be distributed in or on the light guide 3 in various ways to meet adaptable and specifiable conditions for light outcoupling. The outcoupling elements 6 are locally limited structural variations in the volume or/and on the surfaces of the light guide 3. Therefore, the concept of the outcoupling element 6 as well as that of the focusing element 6a explicitly do not cover any additional optical layers applied to the surfaces of the light guide 3, such as, for example, diffusion coatings, reflection coatings, or brightness enhancement or polarization-recycling (dual brightness enhancement) films ((D)BEF). These additional layers not covered by the concept of "outcoupling element" normally rest but loosely on the large surfaces without forming a physical entity with the light guide 3. By contrast, varnishes applied to the large surfaces and bonding to the light guide 3 by chemical reactions do form a physical entity with the light guide 3 and cannot be separated from it; such varnishes; therefore, do not count among additional layers in the above sense.

Further, in case of outcoupling elements 6 and/or focusing elements 6a consisting of microlenses and/or microprisms and/or three-dimensional structural elements, it is feasible that these are at least partially provided with a partial or total, especially angle-dependent, mirror coating.

Outcoupling elements 6 and/or focusing elements 6a to be furnished on at least one of the large surfaces of the light guide 3 are preferably made of some polymer (e.g., varnish, plastic such as PC or PMMA, etc.), silicon or glass, with the structure embossed on them by means of a tool. This possible in mass production, for example by applying a UV-curing material—e.g., a varnish, a monomer etc.—to a light guide substrate, structuring the said material by means of a tool, and curing it by UV radiation, e.g., polymerization. Other radiation-curing materials can be use a well. The recesses required for fashioning the outcoupling elements can be formed, e.g., mechanically, by lithography or printing, but also by the application, conversion, removal or dissolution of material.

In this way, grating structures, microprisms—either convex with an outward plastic portion on the surface and/or concave as an embossment or recess within the surface layer of the structured plastic—, other three-dimensional structural elements with other forms, or also microlenses can be made cost-effectively and by mass production. Concave and convex structures can be used equally well.

As outcoupling elements 6 in the volume, nanoparticles such as titanium dioxide are also eligible.

Another possible option is to have outcoupling elements 6 and/or focusing elements 6a on both large surfaces and additionally in the volume.

Moreover, it can be of advantage to arrange an absorbing layer on the edge of the light guide 3 opposite the light incoupling side of the light source 4 to prevent light incident there from being reflected back again and possibly coupled out at undesirable angles.

As shown in the drawings FIGS. 1, 2, 4 and 8, the invention is preferably with a display screen that can be operated in at least two operating modes, viz B1 for a free viewing mode and B2 for a restricted viewing mode and that comprises at least the following components:

an illuminating apparatus 1a according to the invention, and a transmissive image generator 5 arranged in front of the light guide 3 (as seen in the viewing direction).

The image generator taken in account below is an LCD panel. Here it can be of advantage to arrange at least one polarizing filter above or below the light guide 3 (as a rule, this filter polarizes light linearly, and its polarizing direction is parallel to the input-side polarizing direction of the LCD panel.) If such a polarizing filter is provided behind the light guide 3 (in the viewing direction), light that is reflected by the LCD panel and not polarized in parallel to the input-side polarizing direction of the LCD panel will be absorbed and thus neither scattered inside, nor reflected by, the light guide 3, which is beneficial for the quality of the viewing mode B2. By contrast, if the said polarizing filter is arranged in front of the light guide 3 (in the viewing direction), light that is reflected there by the LCD panel and not polarized in parallel to the input-side polarizing direction of the LCD panel will be absorbed. This means that, advantageously, no or almost no light is reflected by the LCD panel back onto the light guide 3, because this light in the light guide 3 could be returned to the panel as stray light, which can deteriorate the viewing mode B2.

The said LCD panel as an image generator preferably has a maximum haze value of 10% and/or a maximum predefined scattering property. The latter might be, e.g., that at least 90% of the light passing the LCD panel is scattered by maximally 10°.

Figure 7:
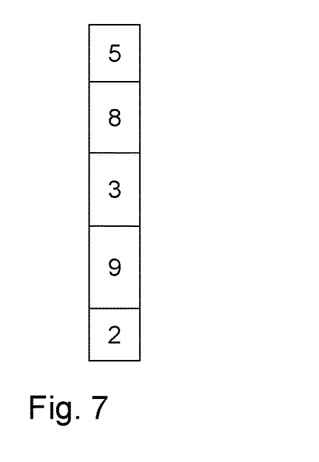
FIG. 7 is a schematic diagram of an exemplary assembly in which light of an unfit type of polarization is at least partially recycled.

Advantageously, as shown in FIG. 7, the invented illuminating apparatus 1a in interaction with an LCD panel as an image generator 5 for recycling light polarized in a manner unfit for the input side of the LCD panel, can be configured further, comprising an optical element 9 located in front of the plate-shaped light guide 3 (as seen in the viewing direction), that transmits light of a first type of polarization (this type of polarization corresponding to the input-side polarization of the said LCD panel) and reflects light of a second type of polarization, an optical element 9 located behind the plate-shaped light guide 3, which, in a first alternative, is configured as a switchable mirror and optionally reflects light coming from the direction of the light guide 3, or which, in a second alternative, permanently and simultaneously reflects and transmits light, or which, in a third alternative, reflects and/or transmits light depending on its polarization.

In this useful configuration, the light of the second type of polarization, which otherwise would be absorbed by the input-side polarizing filter of the LCD and thus would not be available for the performance of the apparatus, be returned to the optical element 9 through the light guide 3. The said optical element 9, in turn, returns at least part of the light originating from, and incident upon, the optical element 8 back toward the LCD panel. Due to the reflection by, and/or passage through, the light guide 3 equipped with outcoupling elements 6 and/or focusing elements 6a, at least part of that light will be polarized in a different manner, so that it passes the input-side polarizer of the LCD panel, thus enhancing the efficiency of the configuration. Ideally, in this configuration, the light guide does not, or almost not, feature birefringence, so that the polarizing recycling operates without visible color patterns.

Differing outcoupling elements 6 can differ in shape/or size.

Further, it is of advantage in some applications if the said restricted angular range for the B2 mode is arranged asymmetrically around the surface normal of the background illuminator.

The asymmetry is preferably configured in one of the preferred directions. This is helpful especially for use in vehicles, e.g. if a display screen combined with the invented illuminating apparatus is arranged on the dashboard approximately in the middle between driver and front-seat passenger (known as a center information display). Here, the restricted angular range in B3 mode, exclusively intended for vision by the front-seat passenger, has to be configured asymmetrically, i.e., directed toward the passenger. Here, the preferred direction, in which the asymmetry is configured, corresponds to the horizontal.

It is also possible, though, that no asymmetry is configured here. In that case, the display screen 1 according to the invention would be arranged directly in front t of the front-seat passenger.

The background illuminator 1a consists, for example, of a backlight unit typical for an LCD with a light guide that receives light from light sources, a diffusor, at least one prism foil, and perhaps a polarizing reflector (3M DBEF™ or wiregrid polarizer), the polarized transmission of which matches the polarized transmission of the input-side of the LCD panel, and a reflector in the rear. Other embodiments are possible as well. Accordingly, the background illuminator can basically be designed like an LED-background illuminator, for example like a side-light, edgelight, direct LED backlight, edge LED backlight, OLED or some other surface emitter.

Means for diminishing or control of reflections, e.g., an antiglare and/or antireflection coating, may be arranged on the upper side of the image generator 5 and/or on at least one of the large surfaces of the light guide 3.

In all embodiments mentioned before, the said light sources may be LEDs, LED lines or laser diodes. Other versions are also feasible and are within the scope of the invention.

If a particularly bright mode is desired for the frontal view, the light sources 4 may also be switched on in mode B1, which is not shown in the drawing.

The invented illuminating apparatus 1a described above and the display screen configurable therewith solve the problem of the invention. It enables well practicable solutions for the safe, private display of information at an optionally restricted viewing angle, whereas another mode of operation provides free vision at an unrestricted viewing angle. The invention can be implemented by plain means and at low cost. In both operating modes, the native resolution of the image generator used is available. The solution involves but little light loss.

The invention described above can be used to advantage wherever private data are displayed and/or entered, such as during the entry of PINs or passwords, the display of data on cash dispensers or payment terminals, or the reading of e-mails on mobile devices. As described farther above, the invention can also be used in cars.

What is claimed is:

1. An illuminating apparatus for a display screen with a transmissive image generator, wherein the image generator features pixels that are composed of subpixels, and wherein the illuminating apparatus can be operated in at least two modes of operation, viz B1 for a free viewing mode and B2 for a restricted viewing mode, comprising:

a background illuminator of planar extension that radiates light over a wide angular range, a plate-shaped light guide that is located in front of the background illuminator, as seen in the viewing direction, the light guide including a plurality of outcoupling elements on at least one large surface of the light guide, or within a volume of the light guide with the light guide being transparent to at least 70% of the light emitted by the background illuminator, light sources arranged laterally on at least one edge of the light guide, wherein the outcoupling elements couple out the light that originates from the light sources and is thrown back and forth in the light guide between large surfaces due to total reflection, the outcoupling being affected by the outcoupling elements featuring, at material junctions, functional surfaces that have a structure configured to cause light incident to said functional surfaces to be coupled out through one of the large surfaces at a defined angular range, whereby, further, the form, number per unit area, and extension of the outcoupling elements are configured in such a way:

that each outcoupling element is smaller in its horizontal and vertical dimensions than a lesser of a width and a height of the subpixels of the image generator, and that, in projection directions parallel to a surface normal of the light guide, parts or all of the surface of at least two outcoupling elements are arranged below each subpixel of the image generator, and that, in projection directions parallel to the surface normal of the light guide, a filling factor of the outcoupling elements is maximally 50% of the large surface area of the light guide, wherein, a distribution of the outcoupling elements on at least one of the large surfaces or within the volume of the light guide is specified in such a way that light radiated by the light sources into the light guide and coupled out of the light guide by the outcoupling elements, satisfies the following conditions:

at least 80% of the total quantity of light coupled out of one of the large surfaces is radiated within a relative angular range of altogether maximally 60°, related to one or two specified, mutually perpendicular preferred directions, and more than 50% of the quantity of light coupled out of the light guide is radiated either in the direction away from the background illuminator or in the direction towards the background illuminator, wherein, in operating mode B2, the background illuminator as well as the light sources are switched on, and wherein, in operating mode B1, at least the background illuminator is switched on.

2. The illuminating apparatus as claimed in claim 1, wherein exactly one preferred direction perpendicular to the surface normal is specified and that the latter corresponds to the horizontal direction regarding an orientation of the image generator.

3. The illuminating apparatus as claimed in claim 1, wherein the light guide includes focusing elements on the large surface of the light guide or within the volume of the light guide, the focusing elements configured to influence light propagation directions of the light coupled out by the outcoupling elements.

4. The illuminating apparatus as claimed in claim 3, wherein the focusing elements are configured to restrict at least 50% of the light coupled out by the outcoupling elements, at least part of that in the propagation directions of that light.

5. The illuminating apparatus as claimed in claim 1, wherein more than half the light radiated into the light guide by the light sources and coupled out of the light guide by the outcoupling elements, with reference to said one or two specified, mutually perpendicular preferred directions has, across the surface, a varied mean radiation angle.

6. The illuminating apparatus as claimed in claim 3, wherein at least part of the outcoupling elements are arranged on an opposite large surface.

7. The illuminating apparatus as claimed in claim 6, wherein a focus of the focusing elements lies in or near a plane of said opposite large surface.

8. The illuminating apparatus as claimed in claim 1, wherein the outcoupling elements have maximum dimensions of 100 μm.

9. The illuminating apparatus as claimed in claim 3, wherein the focusing elements have maximum dimensions of 100 μm.

10. The illuminating apparatus as claimed in claim 1, wherein the outcoupling elements-consist of microlenses and/or microprisms and/or three-dimensional structural elements and/or diffractive structures and/or scattering elements.

11. The illuminating apparatus as claimed in claim 3, wherein the focusing elements-consist of microlenses and/or microprisms and/or three-dimensional structural elements and/or diffractive structures and/or scattering elements.

12. The illuminating apparatus as claimed in claim 10, wherein the outcoupling elements consist of microlenses and/or microprisms and/or three-dimensional structural elements, that are at least partially covered with a mirror layer.

13. The illuminating apparatus as claimed in claim 11, wherein the focusing elements consist of microlenses and/or microprisms and/or three-dimensional structural elements, that are at least partially covered with a mirror layer.

14. The illuminating apparatus as claimed in claim 1, wherein the outcoupling elements are formed within the volume of the light guide, and the outcoupling elements are configured as cavities.

15. The illuminating apparatus as claimed in claim 14, wherein the outcoupling elements have outer shapes of microlenses, microprisms, diffractive structures, nanoparticles and/or three-dimensional structural elements.

16. The illuminating apparatus as claimed in claim 1, wherein the outcoupling elements are formed from polymer or glass structured with a tool via mechanical processing, lithography, printing, or by the application, conversion or dissolution of material.

17. The illuminating apparatus as claimed in claim 3, wherein the outcoupling elements and/or the focusing elements are formed from polymer or glass structured with a tool via mechanical processing, lithography, printing, or by the application, conversion or dissolution of material.

18. The illuminating apparatus as claimed in claim 1, wherein the relative angular range is maximally 40°.

19. The illuminating apparatus as claimed in claim 8, wherein the outcoupling elements have maximum dimensions in a range of 8 μm to 30 μm.

20. The illuminating apparatus as claimed in claim 9, wherein the focusing elements have maximum dimensions in a range of 8 μm to 30 μm.

21. The illuminating apparatus as claimed in claim 1, wherein the structure comprises a tilted surface.

22. A display screen that can be operated in at least two operating modes, viz B1 for a free viewing mode and B2 for a restricted viewing mode, comprising:

an illuminating apparatus as claimed in claim 1, and a transmissive image generator arranged in front of the light guide, as seen in the viewing direction.

23. The display screen as claimed in claim 22, wherein in front of the image generator, as seen in the viewing direction, a second light guide is arranged that is configured for the outcoupling of light and is configured to be laterally fed with light by light sources.

24. The display screen as claimed in claim 22, wherein the second light guide is configured with outcoupling elements.

25. The display screen as claimed in claim 22, wherein the image generator is an LCD panel, and a polarizing filter is arranged above or below the light guide.

26. The display screen as claimed in claim 22, further comprising:
- an optical element that is located in front of the plate-shaped light guide, as seen in the viewing direction, and transmits light of a first kind of polarization and reflects light of a second kind of polarization,
- an optical element located behind the plate-shaped light guide, as seen in the viewing direction, configured as a switchable mirror that reflects light coming from a direction of the light guide, or configured to permanently reflect and simultaneously transmit part of the light, or configured to reflect and/or transmit light dependent on a polarization of the light.

* * * * *